(12) United States Patent
Boegner et al.

(10) Patent No.: US 6,872,365 B1
(45) Date of Patent: Mar. 29, 2005

(54) EXHAUST GAS CLEANING SYSTEM HAVING INTERNAL AMMONIA PRODUCTION FOR REDUCING NITROGEN OXIDES

(75) Inventors: Walter Boegner, Remseck (DE); Martin Hartweg, Erbach (DE); Brigitte Konrad, Blaustein (DE); Bernd Krutzsch, Denkendorf (DE); Michel Weibel, Bernsteinstrasse (DE); Guenter Wenninger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/744,028
(22) PCT Filed: Mar. 24, 2000
(86) PCT No.: PCT/EP00/02623
§ 371 (c)(1), (2), (4) Date: May 2, 2001
(87) PCT Pub. No.: WO00/71868
PCT Pub. Date: Nov. 30, 2000

(30) Foreign Application Priority Data

May 9, 1999 (DE) .......................................... 199 22 960

(51) Int. Cl.$^7$ ................................................ F01N 3/10
(52) U.S. Cl. ......................... 422/174; 422/168; 422/173
(58) Field of Search ................................. 422/174, 168, 422/173, 186, 186.04

(56) References Cited

U.S. PATENT DOCUMENTS

| | | | |
|---|---|---|---|
| 3,449,063 A | * 6/1969 | Griffing et al. | 423/213.2 |
| 3,767,764 A | 10/1973 | Dolbear | 423/213.2 |
| 5,711,147 A | * 1/1998 | Vogtlin et al. | 60/274 |
| 5,964,088 A | * 10/1999 | Kinugasa et al. | 60/286 |
| 6,345,496 B1 | * 2/2002 | Fuwa et al. | 60/274 |

FOREIGN PATENT DOCUMENTS

| | | |
|---|---|---|
| DE | 195 10 804 | 9/1996 |
| EP | 0 802 315 | 10/1997 |
| WO | WO 97/17532 | 5/1997 |

* cited by examiner

Primary Examiner—M. Alexandra Elve
(74) Attorney, Agent, or Firm—Crowell & Moring LLP

(57) ABSTRACT

An exhaust-gas cleaning system for cleaning exhaust gas from a combustion source so as to remove at least nitrogen oxides contained therein is provided. An ammonia-generation catalytic converter for generating ammonia uses constituents of at least some of the exhaust gas emitted from the combustion source during ammonia-generation operating phases. A downstream nitrogen oxide reduction catalytic converter is provided for reducing nitrogen oxides which are contained in the exhaust gas emitted from the combustion source using the ammonia generated as the reducing agent. According to the invention, a plasma generator for using plasma technology to generate reactive particles, which promote the ammonia-generation reaction, from constituents of the exhaust gas fed to the ammonia-generation catalytic converter during the ammonia-generation operating phases is connected upstream of the ammonia-generation catalytic converter. This ensures that sufficient ammonia is generated even at relatively low exhaust-gas temperatures.

13 Claims, 1 Drawing Sheet

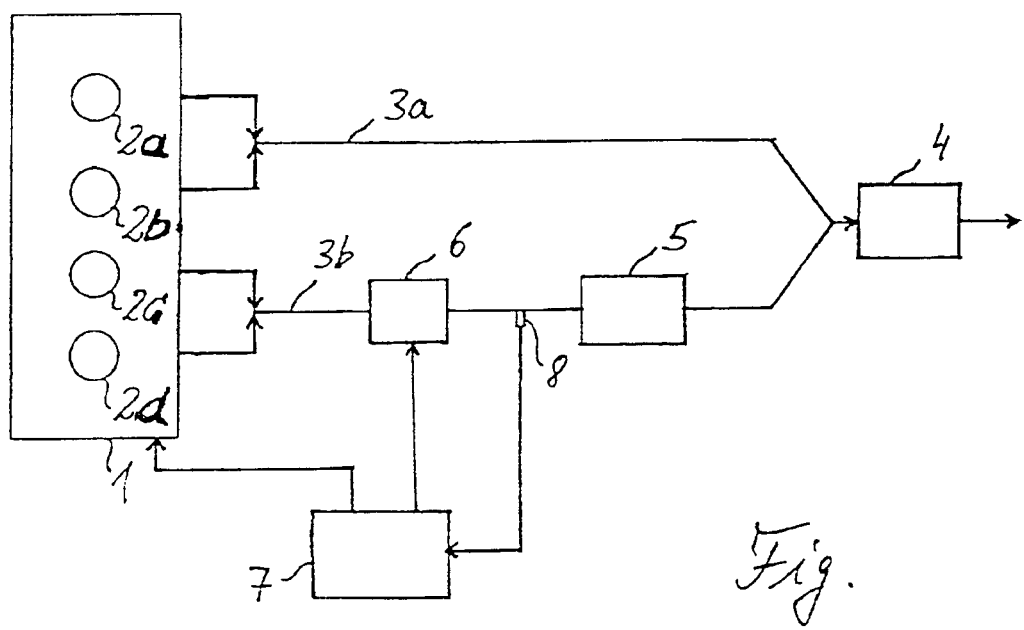
Fig.

EXHAUST GAS CLEANING SYSTEM HAVING INTERNAL AMMONIA PRODUCTION FOR REDUCING NITROGEN OXIDES

BACKGROUND AND SUMMARY OF THE INVENTION

The invention relates to an exhaust-gas cleaning system for cleaning the exhaust gas from a combustion source so as to remove at least nitrogen oxides which are contained therein having an ammonia-generation catalytic converter for generating ammonia using constituents of at least some of the exhaust gas emitted from the combustion source during ammonia-generation operating phases, and a nitrogen oxide reduction catalytic converter, which is connected downstream of the ammonia-generation catalytic converter, for reducing nitrogen oxides which are contained in the exhaust gas emitted from the combustion source using the ammonia generated as the reducing agent.

Exhaust-gas cleaning systems of this type are used in particular for exhaust-gas cleaning in motor vehicle internal-combustion engines and are described, for example, in publications EP 0 802 315 A2 and WO 97/17532 A1. They include a nitrogen oxide reduction catalytic converter for the selective catalytic reduction of nitrogen oxides which are contained in the exhaust gas emitted from the combustion source using ammonia as the reducing agent, referred to for short as the SCR process. In order that it is not necessary to hold a stock of ammonia or a precursor in a tank, an ammonia-generation catalytic converter is connected upstream of the nitrogen oxide reduction catalytic converter, the ammonia-generation catalytic converter generating the ammonia which is required using constituents of at least some of the exhaust gas which is emitted from the combustion source during corresponding ammonia-generation operating phases, specifically by means of a synthesis reaction of hydrogen and nitrogen monoxide. In these ammonia-generation operating phases, a rich air ratio is set for the exhaust gas which is fed to the ammonia-generation catalytic converter, in order that sufficient hydrogen be available. In this context, the terms rich and lean air ratio, also known as the lambda value, are understood as meaning, as is customary, a composition of the exhaust gas or of the associated fuel mixture burnt in the combustion source which deviates from the stoichiometric composition towards being fuel-rich or oxygen-rich, respectively. In this context, if only for fuel consumption reasons it is desired for the combustion source to be operated as much as possible in lean-burn mode and as little as possible in rich-burn mode, for example as a result of prolonged lean-burn operating phases alternating with brief rich-burn operating phases or, in the case of a multicylnder internal-combustion engine, only some of the cylinders, and preferably likewise only from time to time, being operated in rich-burn mode, whereas the other cylinders are continuously operated in lean-burn mode.

The ammonia-generation catalytic converter used is usually a three-way catalytic converter which contains as the catalyst material, by way of example, Pt and/or Rh supported on $\gamma$—$Al_2O_3$, which is suitable for catalysing the synthesis reaction of hydrogen and nitrogen monoxide to form ammonia. However, it has been found that without further measures the selectivity for effective ammonia formation by this synthesis reaction is only present at a sufficiently high temperature of the order of magnitude of above approximately 250° C. to 300° C. This is primarily attributable to the fact that the selectivity of this catalytic ammonia synthesis reaction only rises to a level which can be used in practice when this temperature is exceeded.

The invention is based on the technical problem of providing an exhaust-gas cleaning system of the type mentioned in the introduction in which ammonia can be synthesized in significant quantities even at relatively low temperatures of below approximately 250° C. to 300° C. and is available as a reducing agent for nitrogen oxide reduction at such temperatures.

The invention solves this problem by providing an exhaust-gas cleaning system wherein a plasma generator is connected upstream of the ammonia-generation catalytic converter for generating reactive particles using plasma technology from constituents of the exhaust gas which is fed to the ammonia-generation catalytic converter during the ammonia-generation operating phases, which reactive particles assist the ammonia-generation reaction in the ammonia-generation catalytic converter. This system characteristically contains a plasma generator connected upstream of the ammonia-generation catalytic converter. This generator, at least from time to time during the ammonia-generation operating phases, generates a plasma through which the exhaust gas which is then fed to the ammonia-generation catalytic converter is passed. The plasma-generation parameters are set in such a way that reactive particles such as H, OH and/or $O_2H$ free radicals are formed from constituents of the exhaust gas passed through, which free radicals promote the ammonia-generation reaction in the ammonia-generation catalytic converter. It is thus possible especially, ever in the low temperature range, in which the ammonia synthesis reaction from the exhaust-gas constituents does not proceed effectively without further assistants, for ammonia to be generated internally in significant amounts, which is then available for the nitrogen oxide reduction. External metering of the ammonia or a precursor in these periods with a relatively low ammonia-generation catalytic converter temperature can therefore generally be dispensed with without having to forego an effective, ammonia-based nitrogen oxide reduction.

In an exhaust-gas cleaning system which is refined means for detecting the ammonia-generation catalytic converter temperature and a plasma control unit are provided, in such a manner that during the ammonia-generation operating phases the plasma for the generation of reactive particles is provided precisely in those periods in which the temperature of the ammonia-generation catalytic converter is below a predeterminable temperature threshold. This threshold is expediently selected in such a way that at temperatures above the threshold effective ammonia synthesis is effected in the ammonia-generation catalytic converter even without the reactive particles generated using plasma technology. In a further, preferred configuration of this measure, the corresponding plasma control unit is designed for a temperature threshold of between 200° C. and 300° C., preferably for a threshold of approximately 250° C. It has been found that effective plasma-assisted ammonia synthesis can be effected below this temperature range and effective ammonia synthesis can be effected even without additional plasma activation above this temperature range.

BRIEF DESCRIPTION OF THE DRAWING

An advantageous embodiment of the invention is illustrated in the drawing and is described below.

The only FIGURE shows a schematic block diagram of an internal combustion engine with associated exhaust-gas cleaning system.

DETAILED DESCRIPTION OF THE DRAWING

The exhaust-gas cleaning system shown is used to clean the exhaust gas from a combustion source in the form of a four-cylinder internal-combustion engine 1 such as can be used in particular in motor vehicles as an internal combustion engine which is operated predominantly in lean-burn mode. Of the four cylinders 2a to 2d, a first and second cylinder 2a, 2b are connected in parallel to a first exhaust pipe branch 3a, and a third and fourth cylinder 2c, 2d are connected to a second exhaust pipe branch 3b which is parallel to the first. The two exhaust pipe branches 3a, 3b together open into a nitrogen oxide reduction catalytic converter 4. In the second exhaust pipe branch 3b, an ammonia-generation catalytic converter 5 is arranged upstream of the nitrogen oxide reduction catalytic converter 4. This ammonia-generation catalytic converter may, for example, be formed by a three-way catalytic converter which contains a Pt and/or Rh catalyst material on a $\gamma$—$Al_2O_3$ support material, which is able, at a sufficiently high temperature, to catalyse the synthesis of ammonia from hydrogen and nitrogen monoxide in accordance with the following equation $$5/2 \cdot H_2 + NO \rightarrow NH_3 + H_2O.$$

If no further measures are taken, this catalytic converter can be used to synthesize ammonia with sufficient selectivity at temperatures of at least approximately 250° C. to 300° C. The ammonia can then be used in the nitrogen oxide reduction catalytic converter 4 as a reducing agent for nitrogen oxides.

To be able to prepare significant quantities of ammonia for nitrogen oxide reduction even at lower temperatures of below approximately 250° C. to 300° C., a plasma generator 6 is connected upstream of the ammonia-generation catalytic converter 5 in the second exhaust branch 3b. The plasma generator 6 can be used, at the corresponding location in the second exhaust pipe branch 3b, to ignite a plasma through which is passed the exhaust gas which is emitted from the third and fourth cylinders 2c, 2d of the internal combustion engine 1 and is guided via the second exhaust pipe branch 3b before it reaches the ammonia-generation catalytic converter 5. The plasma parameters are selected in such a way that reactive particles, in particular free radicals, are formed from constituents contained in the exhaust gas flowing through the plasma, these reactive particles, for example H, OH and $O_2H$ free radicals, assisting the ammonia synthesis reaction in the downstream ammonia-generation catalytic converter 5. The plasma generator 6 is driven by a plasma control unit which, in the example shown, is formed by an engine control unit 7 which additionally controls the internal combustion engine 1 and the remaining components of the exhaust-gas cleaning system using conventional control principles.

The plasma generator 6 can be controlled by the plasma control unit 7 as a function of the temperature of the ammonia-generation catalytic converter S. To detect the ammonia-generation catalytic converter temperature, a temperature sensor 8 is provided in the second exhaust pipe branch 3b, between plasma generator 6 and ammonia-generation catalytic converter 5, which sensor measures the temperature of the exhaust-gas stream which is present at that location and represents an unambiguous measurement of the temperature of the ammonia-generation catalytic converter 5 which is heated by this exhaust-gas stream. It will be understood that the ammonia-generation catalytic converter temperature may alternatively also be detected in some other way, for example by a temperature sensor directly in the ammonia-generation catalytic converter 5 or by indirect exhaust-gas temperature detection from the operating parameters of the internal combustion engine 1.

The structure shown allows the following advantageous method of operation to be implemented for the internal-combustion engine 1 and the associated exhaust-gas cleaning system. For simple reasons of fuel consumption, the internal-combustion engine 1 is operated as much as possible in lean-burn mode. For this purpose, the first two cylinders 2a, 2b can continuously be operated with a lean air/fuel mixture, i.e. with air/fuel ratios A of greater than the stoichiometric value of unity. Accordingly, the air ratio $\lambda$ of the exhaust gas emitted from these two cylinders 2a, 2b into the first exhaust pipe branch 3a is above the stoichiometric value of unity. In addition to excess oxygen, an exhaust-gas composition of this nature generally also contains elevated quantities of nitrogen oxides. To allow these nitrogen oxides to be effectively converted in the nitrogen oxide reduction catalytic converter 4 by selective catalytic reduction using ammonia as the reducing agent, the ammonia required is generated on an ongoing basis via the second exhaust pipe branch 3b.

For this purpose, the third and fourth cylinders 2c, 2d are operated at least from time to time in corresponding ammonia-generation operating phases with a rich air/fuel mixture. Accordingly, the air ratio $\lambda$ of the exhaust gas emitted from these cylinders 2c, 2d into the second exhaust pipe branch 3b is below the stoichiometric value of one. In addition to unburnt hydrocarbons, an exhaust-gas composition of this type additionally also contains hydrogen and a certain amount of nitrogen oxides. The plasma generator 6 is switched on and off depending on the temperature in the ammonia-generation catalytic converter 5, which is determined using an exhaust-gas temperature measurement by the temperature sensor 8 or in some other way.

Specifically, the plasma generator 6 remains switched off for as long as the ammonia-generation catalytic converter temperature is above a predetermined temperature threshold, which is preferably fixed at approximately 250° C., generally at a suitable value in the range, for example, between 200° C. and 300° C. The set temperature value which is most suitable for the particular case can be set at the plasma control unit. In this higher temperature range, the enriched exhaust-gas stream in the second exhaust pipe branch 3b passes through the plasma generator 6 without being influenced and passes into the ammonia-generation catalytic converter 5, in which ammonia is generated from the exhaust-gas constituents hydrogen and nitrogen monoxide in accordance with the above synthesis reaction. At these temperatures of above approximately 250° C. to 300° C., the synthesis reaction proceeds with high selectivity under the catalytic effect of the catalyst material present there, and therefore is very effective. Together with the exhaust-gas stream from the second exhaust pipe branch 3b, the ammonia which is generated passes to the nitrogen oxide reduction catalytic converter 4, where it acts as a reducing agent for the selective catalytic reduction of the nitrogen oxides which are contained in the two exhaust-gas streams from the parallel exhaust pipe branches 3a, 3b fed to the nitrogen oxide reduction catalytic converter 4. During this reduction reaction, the nitrogen oxides are reduced to nitrogen, with water being formed.

If, during the ammonia-generation operating phase, the ammonia-generation catalytic converter temperature is below the predetermined threshold, the plasma generator 6 is activated by the plasma control unit 7. The exhaust gas emitted from the third and fourth cylinders 2c, 2d into the second exhaust pipe branch 3b then passes through the ignited plasma in the plasma generator 6, with the result that the reactive particles mentioned, primarily H, OH and/or $O_2H$ free radicals, are formed, which together with the exhaust-gas stream pass to the ammonia-generation catalytic converter 5, where they ensure that the ammonia synthesis reaction, despite the low selectivity with regard to ammonia formation at these low temperatures, proceeds to a sufficient extent to provide a quantity of ammonia sufficient for the subsequent nitrogen oxide reduction in the nitrogen oxide reduction catalytic converter 4. Then, as soon as further operation of the internal-combustion engine 1 causes the exhaust-gas temperature to rise above the temperature threshold, the plasma control unit 7 switches off the plasma generator 6.

Depending on the particular application, during operation of the third and fourth cylinders 2c, 2d and the associated exhaust-gas cleaning components in the second exhaust pipe branch 3b, the ammonia-generation operating phases described, in which a rich exhaust-gas composition is set for the exhaust gas flowing through the ammonia-generation catalytic converter 5, alternate with lean-burn operating phases, in which these two cylinders 2c, 2d are operated with a lean air/fuel mixture, or alternatively the ammonia-generation mode described is continuous. If the third and fourth cylinders 2c, 2d are also operated at least from time to time in lean-burn mode, the plasma control unit 7 keeps the plasma generator 6 switched off during these lean-burn operating phases. During the lean-burn operating phases, the downstream three-way catalytic converter 5 is not used primarily for ammonia synthesis, but predominantly fulfils its standard three-way catalytic converter exhaust-gas cleaning function of cleaning a lean exhaust-gas stream. It is possible for the part of the system which generates ammonia in rich-burn operating phases to be operated in lean-burn mode from time to time in this way in particular when there is an ammonia-storage component, for example as a result of the ammonia-generation catalytic converter 5 or the nitrogen oxide reduction catalytic converter 4 having a certain ammonia storage capacity or as a result of an additional ammonia store, for example in the form of an ammonia adsorption catalyst, being arranged between the ammonia-generation catalytic converter 5 and the nitrogen oxide reduction catalytic converter 4. In this case, the system is designed in such a way that the ammonia-generating part of the system, during the ammonia-generation operating phases, generates more ammonia than is required immediately for the nitrogen oxide reduction, so that the excess ammonia can be temporarily stored and is available for the continuous reduction of nitrogen oxides in a subsequent lean-burn operating phase of the ammonia-generating part of the system.

As a further variant, it is possible, in a conventional way, to provide for the system to operate with alternating nitrogen oxide adsorption phases and nitrogen oxide desorption phases, for which purpose the exhaust-gas cleaning system then has at least one corresponding nitrogen oxide adsorber at a suitable point in the exhaust train, for example upstream or downstream of the ammonia-generation catalytic converter 5 or in an exhaust pipe branch which runs parallel to the exhaust pipe branch of the ammonia-generation catalytic converter.

It will be understood that the combination according to the invention of ammonia-generation catalytic converter and upstream plasma generator which can be controlled as a function of exhaust-gas temperature can be used not only for the example shown but also for systems with a different mobile or stationary combustion source with associated exhaust train which comprises one or more parallel subsections. Furthermore, it will be understood that, depending on requirements, the exhaust-gas cleaning system may contain further conventional exhaust-gas cleaning components (not shown).

In all cases, the invention makes it possible, as is clear from the examples mentioned above, to convert nitrogen oxides which are contained in the exhaust gas from an internal-combustion engine or any other mobile or stationary combustion source by selective catalytic reduction using internally generated ammonia as the reducing agent within a wide exhaust-gas temperature range of between approximately 200° C. and approximately 500° C. or more generally between approximately 150° C. and approximately 700° c, without its generally being necessary to store ammonia or a precursor, such as for example urea, in a tank.

What is claimed is:

1. Exhaust-gas cleaning system for cleaning the exhaust gas which is emitted from a combustion source, in particular a motor vehicle internal-combustion engine, so as to remove at least nitrogen oxides which are contained therein, having
    an ammonia-generation catalytic converter for generating ammonia using constituents of at least some of the exhaust gas emitted from the combustion source during ammonia-generation operating phases, and
    a nitrogen oxide reduction catalytic converter, which is connected downstream of the ammonia-generation catalytic converter, for reducing nitrogen oxides which are contained in the exhaust gas emitted from the combustion source using the ammonia generated as the reducing agent, characterized by
    a plasma generator, which is connected upstream of the ammonia-generation catalytic converter, for generating, using plasma technology, reactive particles, which assist the ammonia-generation reaction in the ammonia-generation catalytic converter, from constituents of the exhaust gas which is fed to the ammonia-generation catalytic converter during the ammonia-generation operating phases.

2. Exhaust-gas cleaning system according to claim 1, further characterized by
    means for determining the temperature of the ammonia-generation catalytic converter, and
    a plasma control unit, which keeps the plasma generator activated when the ammonia-generation catalytic converter temperature determined is below a predeterminable temperature threshold, and keeps it deactivated when the ammonia-generation catalytic converter temperature determined is above the predeterminable temperature threshold.

3. Exhaust-gas cleaning system according to claim 2, further characterized in that the plasma control unit is designed for a temperature threshold of between 200° C. and 300° C., preferably approximately 250° C.

4. Method of operating an internal combustion engine which in use emits exhaust gas, comprising:
    separating the exhaust gas into a plurality of separate exhaust gas flows,
    passing a first of the exhaust gas flows from the engine to a nitrogen oxide reduction catalytic converter along a first flow path,
    passing a second of the exhaust gas flows from the engine to the nitrogen oxide reduction catalytic converter along a second flow path,
    passing the second gas flow through an ammonia generating catalytic converter disposed in the second flow path upstream of the nitrogen oxide reduction catalytic converter to thereby generate ammonia using a portion of the exhaust gas during ammonia generation operating phases, assisting ammonia generation reactions in the ammonia generating catalytic converter during the ammonia generating operating phases using a plasma generator connected upstream of the ammonia generating catalytic converter and utilizing reactive particles from constituents of the exhaust gas in the second exhaust gas flow.

5. A method according to claim 4, comprising monitoring the temperature of exhaust gases between the plasma generator and the ammonia generating catalytic converter and using said temperature to control actuation of the plasma generator when said temperature is below a predetermined temperature threshold and to control deactivation of the plasma generator when said temperature is above said temperature threshold.

6. A method according to claim 5, wherein said temperature threshold is between 200° C. and 300° C.

7. A method according to claim 6, wherein said temperature threshold is approximately 250° C.

8. A method according to claim 4, wherein said first flow path directly communicates the exhaust gas to the nitrogen oxide reduction catalytic converter in bypassing relation to the second flow path through the plasma generator and the ammonia generating catalytic converter.

9. An internal combustion engine assembly which in use emits exhaust, comprising exhaust gas separating means for separating the exhaust gas into a plurality of separate exhaust gas flows, means for passing a first of the exhaust gas flows from the engine to a nitrogen oxide reduction catalytic converter along a first flow path, means for passing a second of the exhaust gas flows from the engine to the nitrogen oxide reduction on catalytic converter along a second flow path, means for passing the second gas flow through an ammonia generating catalytic converter disposed in the second flow path upstream of the nitrogen oxide reduction catalytic converted to thereby generate ammonia using a portion of the exhaust gas during ammonia generation operating phases, and means for assisting ammonia generation reactions in the ammonia generating catalytic converter during the ammonia generating operating phases using a plasma generator connected upstream of the ammonia generating catalytic converter and utilizing reactive particles from constituents of the exhaust gas in the second exhaust gas flow.

10. The assembly according to claim 9, comprising means for monitoring the temperature of exhaust gases between the plasma generator and the ammonia generating catalytic converter, and means for controlling actuation of the plasma generator when said temperature is below a predetermined temperature threshold and for controlling deactivation of the plasma generator when said temperature is above said temperature threshold.

11. The assembly of claim 10, wherein said temperature threshold is between 200° C. and 300° C.

12. The assembly of claim 11, wherein said temperature threshold is approximately 250° C.

13. The assembly of claim 9, wherein said first flow path directly communicates the exhaust gas to the nitrogen oxide reduction catalytic converter in bypassing relation to the second flow path through the plasma generator and the ammonia generating catalytic converter.

* * * * *

UNITED STATES PATENT AND TRADEMARK OFFICE
CERTIFICATE OF CORRECTION

PATENT NO. : 6,872,365 B1
DATED : March 29, 2005
INVENTOR(S) : Boegner et al.

It is certified that error appears in the above-identified patent and that said Letters Patent is hereby corrected as shown below:

<u>Title page,</u>
Item [30], Foreign Application Priority Data, "May 9, 1999" should read -- May 19, 1999 --.

Signed and Sealed this

Sixteenth Day of August, 2005

JON W. DUDAS
*Director of the United States Patent and Trademark Office*